United States Patent
Copeland et al.

(10) Patent No.: US 9,628,692 B2
(45) Date of Patent: Apr. 18, 2017

(54) SELF-POWERED DOOR AND WINDOW OPENING SENSOR

(71) Applicants: Richard L. Copeland, Maryville, TN (US); Melwyn F. Sequeira, Plantation, FL (US)

(72) Inventors: Richard L. Copeland, Maryville, TN (US); Melwyn F. Sequeira, Plantation, FL (US)

(73) Assignee: Tyco Fire & Security GmbH, Neuhausen AM Rheinfall (CH)

(*) Notice: Subject to any disclaimer, the term of this patent is extended or adjusted under 35 U.S.C. 154(b) by 0 days.

(21) Appl. No.: 15/151,743

(22) Filed: May 11, 2016

(65) Prior Publication Data
US 2016/0337572 A1 Nov. 17, 2016

Related U.S. Application Data (60) Provisional application No. 62/160,641, filed on May 13, 2015.

(51) Int. Cl.
| | |
|---|---|
| *G08B 13/08* | (2006.01) |
| *H04N 5/232* | (2006.01) |
| *G08C 17/02* | (2006.01) |
| *H04L 29/12* | (2006.01) |
| *H04N 5/225* | (2006.01) |

(Continued)

(52) U.S. Cl.
CPC ......... *H04N 5/23206* (2013.01); *G08B 13/08* (2013.01); *G08C 17/02* (2013.01); *H04L 61/6022* (2013.01); *H04N 5/2256* (2013.01); *H04N 7/183* (2013.01); *G08B 25/10* (2013.01)

(58) Field of Classification Search
CPC .... G08B 13/08; G08B 25/10; H04N 5/23206; H04N 7/183; H04N 5/2256; G08C 17/02; H04L 61/6022; H03K 17/964; E05Y 2900/132; E05Y 2900/531; E05Y 2400/44; E05Y 2201/41; E05Y 2201/422; E05Y 2015/483; E05Y 2047/0068; Y10T 70/5155
USPC ...... 340/545.4, 541, 530, 539.1, 665, 693.5, 340/545.1, 540
See application file for complete search history.

(56) References Cited

U.S. PATENT DOCUMENTS

| | | | | |
|---|---|---|---|---|
| 5,317,303 A | * | 5/1994 | Ross ................. | G08B 13/08 340/539.26 |
| 5,572,190 A | | 11/1996 | Ross | |

(Continued)

OTHER PUBLICATIONS

ISR and Written Opinion dated Jun. 27, 2016, European Patent Office as Searching Authority, for International Patent Appln. No. PCT/US2016/031726.

*Primary Examiner* — Anh V La
(74) *Attorney, Agent, or Firm* — Fox Rothschild LLP; Robert J. Sacco; Carol E. Thorstad-Forsyth (57) ABSTRACT

Systems and methods for detecting an opening and closing of an object, such as a door or window. The methods comprise: causing a piezoelectric transducer to oscillate in response to an opening of the object; harvesting energy generated as a result of the piezoelectric transducer's oscillation to power a transceiver; and transmitting, from the transceiver to a remote device, information indicating that the opening of the object has been detected by a wireless sensor coupled to the object. The information may specify a logical address linked to a physical location of the object (e.g., a MAC address).

20 Claims, 7 Drawing Sheets

(51) Int. Cl.
*H04N 7/18* (2006.01)
*G08B 25/10* (2006.01)

(56) References Cited

U.S. PATENT DOCUMENTS

| | | | | |
|---|---|---|---|---|
| 6,756,930 | B1 * | 6/2004 | Nunuparov | H02M 3/07 |
| | | | | 323/304 |
| 8,786,435 | B2 * | 7/2014 | Barnett | H05B 37/0272 |
| | | | | 340/506 |
| 2003/0218541 | A1 | 11/2003 | Sakai | |
| 2004/0174287 | A1 * | 9/2004 | Deak | G08C 17/02 |
| | | | | 341/173 |

* cited by examiner

SELF-POWERED DOOR AND WINDOW OPENING SENSOR

CROSS-REFERENCE TO RELATED APPLICATIONS

This application claims priority benefits of U.S. Provisional Patent Application No. 62/160,641 filed on May 13, 2015. The contents of the listed documents are herein incorporated by reference.

FIELD OF THE INVENTION

This document relates generally to sensor based systems (e.g., surveillance and security systems). More particularly, this document relates to self-powered sensors for detecting the opening and closing of a door and/or window.

BACKGROUND OF THE INVENTION

Security systems are well known in the art. Security systems typically employ sensors for detecting the opening and closing of doors and windows. These sensors are often communicatively and electronically coupled to other circuitry of the security systems via wired connections. The wired connections are undesirable because they provide a point of weakness to the security system, as well as drive up the cost and complexity of installing the security system.

SUMMARY OF THE INVENTION

The present disclosure concerns systems and methods for detecting an opening and closing of an object (e.g., a door or window). The methods comprise: causing a piezoelectric transducer to oscillate in response to an opening of the object; harvesting energy generated as a result of the piezoelectric transducer's oscillation to power a transceiver; and transmitting, from the transceiver to a remote device, information indicating that the opening of the object has been detected by a wireless sensor coupled to the object.

In some scenarios, the information specifies a logical address linked to a physical location of the object. The logical address may include a Media Access Control ("MAC") address.

In those or other scenarios, the remote device performs operations to determine if a security breach is occurring or has occurred based on the information received from the transceiver. The remote device may also perform operations to illuminate an area surrounding the object or capture an image of the area surrounding the object when it is determined that a security breach is occurring or has occurred.

In those or other scenarios, the opening of the object is detected when first and second elements of a wireless sensor are pulled apart. The first element comprises a magnet and is disposed on a moving part of the object. The second element comprises the piezoelectric transducer with an end having a magnetic coating and is disposed on a non-moving part of the object. The piezoelectric transducer is cantilevered within an enclosure of the wireless sensor by a mechanical support.

DESCRIPTION OF THE DRAWINGS

Embodiments will be described with reference to the following drawing figures, in which like numerals represent like items throughout the figures, and in which.

DETAILED DESCRIPTION OF THE INVENTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present disclosure concerns security systems employing sensors for detecting when doors, windows and/or other objects are opened and closed. The sensors comprise wireless sensors that are self-powered. The manner in which the wireless sensors generate power will be described in detail below. Still, it should be understood that the wireless sensors generate power using a piezoelectric transducer element that is caused to oscillate when an object is opened or closed. The oscillation causes an AC signal to be generated by and output from the piezoelectric transducer element. The AC signal is then used to power a transceiver of the wireless sensor. The transceiver transmits a unique code or identifier to another network node so that the opening and/or closing of the object can be tracked and analyzed for security purposes.

Notably, the present invention will be described herein in relation to security system applications. The present invention is not limited in this regard. The novel wireless sensors employed herein can be used in any application where the opening and/or closing of an object need to be detected and/or tracked.

Figure 1:
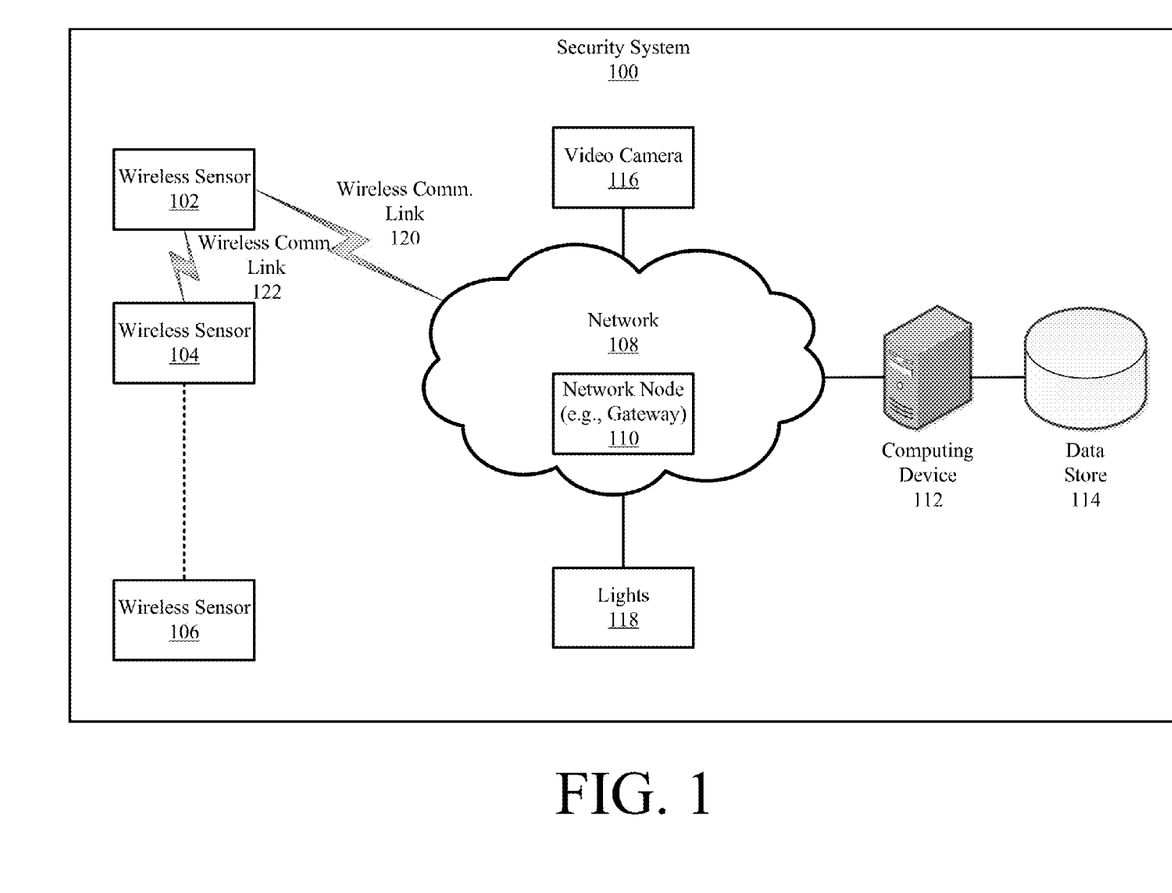
FIG. 1 is a schematic illustration of an exemplary security system that is useful for understanding the present invention.

Referring now to FIG. 1, a schematic illustration of an exemplary security system 100 is provided. The security system 100 is generally configured to detect intrusion or unauthorized entry into a building or area. The security system 100 can be used in residential, commercial, industrial and military properties for protection against theft and property damage, as well as personal protection against intruders. In this regard, the security system 100 comprises a plurality of wireless sensors 102, 104, 106, a network 108, a computing device 112 and a data store 114. Networks, computing devices and data stores are well known in the art, and therefore will not be described in detail herein. Any known or to be known network, computing device and data store can be used herein without limitation.

The wireless sensors 102-106 are coupled to objects (e.g., doors 204 of FIG. 2, door frames 202 of FIG. 2, and/or windows) that can be opened and closed. As such, each wireless sensor 102-106 detects when a respective object is opened and when the respective object is closed. The opening of the object is detected when two elements of a wireless sensor are pulled apart. Thus, in some scenarios, a first element of the wireless sensor is disposed on a moving part of the object (e.g., a moving door), while a second element of the wireless sensor is disposed on a non-moving part of the object (e.g., a door frame). The first element comprises a magnet. The second element comprises a piezoelectric material with a magnetic coating on an end thereof (which could be ferromagnetic or permanent magnet). The magnetic coated end of the second element is arranged so as to be spatially aligned with the magnet of the first element when the wireless sensor is in its closed position shown in FIG. 4. In effect, the magnetic coated end of the piezoelectric material is pulled towards the first element when the wireless sensor is in its closed position, and oscillates when the first and second elements of the wireless sensor are pulled apart.

Figure 2:
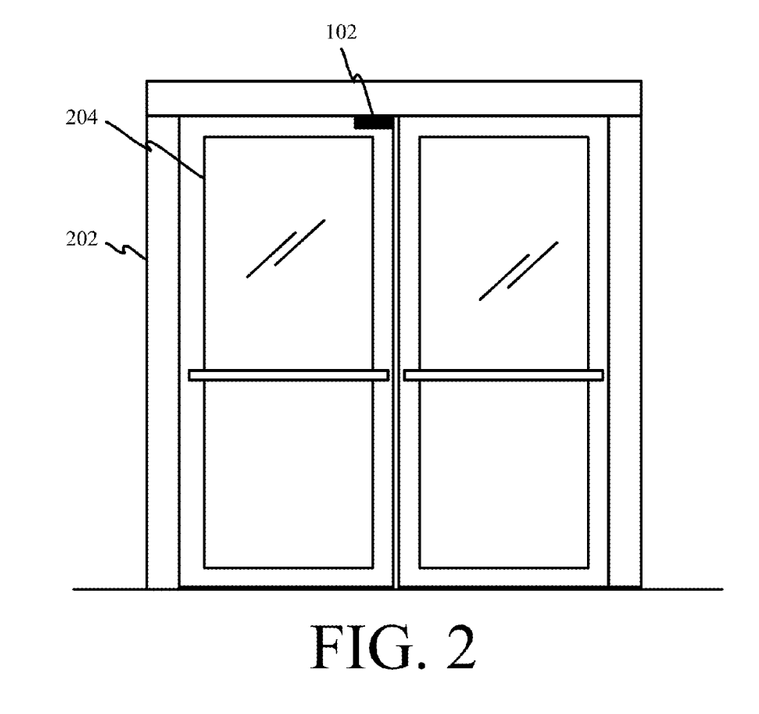
FIG. 2 is a schematic illustration of a door having a wireless sensor of FIG. 1 coupled thereto.

For example, in some scenarios, a first element of wireless sensor 102 is securely attached to a door 204, as shown in FIG. 2. A second element of wireless sensor 102 is securely attached to a door frame 202, as also shown in FIG. 2. In this case, the opening of the door 204 causes the two elements to be pulled apart. A similar configuration of the two elements can be employed for windows. The present invention is not limited to the particulars of this example.

When a wireless sensor detects the opening of the object, it transmits a unique code or identifier to a network node 110 of the network 108 or an adjacent wireless sensor (e.g., wireless sensor 104) via a wireless communication link 120 or 122. The network node 110 then forwards the unique code or identifier to a computing device 112. At the computing device 112, the unique code or identifier is stored in a data store 114 for later use in analyzing the security of a facility or other area.

Analytics can be generated using the unique codes or identifiers received from the wireless sensors 102-106. Also, the security system 100 can take various measures in response to the detected opening and closing of the object(s). For example, if the opening of a door is detected, then lights 118 in proximity to the door will be turned on so that a surrounding area is illuminated. Additionally or alternatively, a video camera 116 can be activated so that video is taken of the person opening the door. In contrast, if the closing of a door is detected, then lights 118 can be turned off such that a surrounding area is no longer illuminated. The present invention is not limited to the particulars of this example.

The wireless sensor 102 will now be described in more detail in relation to FIGS. 2-9. Wireless sensors 104 and 106 are the same as or substantially similar to wireless sensor 102. As such, the following discussion of wireless sensor 102 is sufficient for understanding wireless sensors 104 and 106 of FIG. 1.

Figure 3:
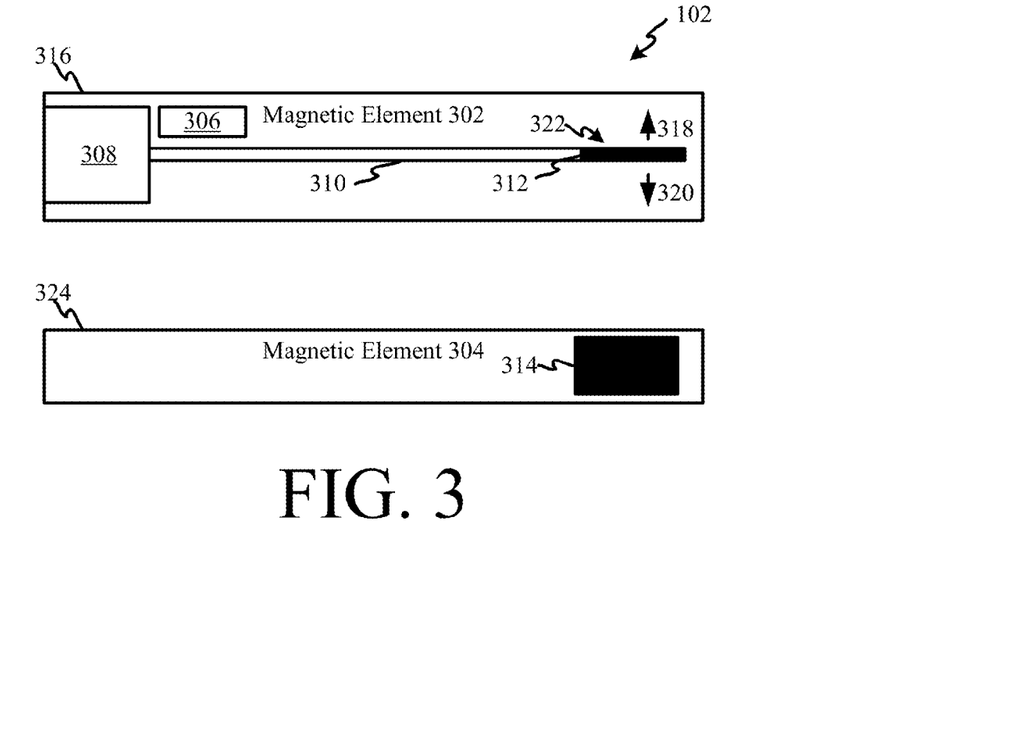
FIGS. 3-4 provide schematic illustrations that are useful for understanding operations of a wireless sensor shown in FIG. 1.
Figure 4:
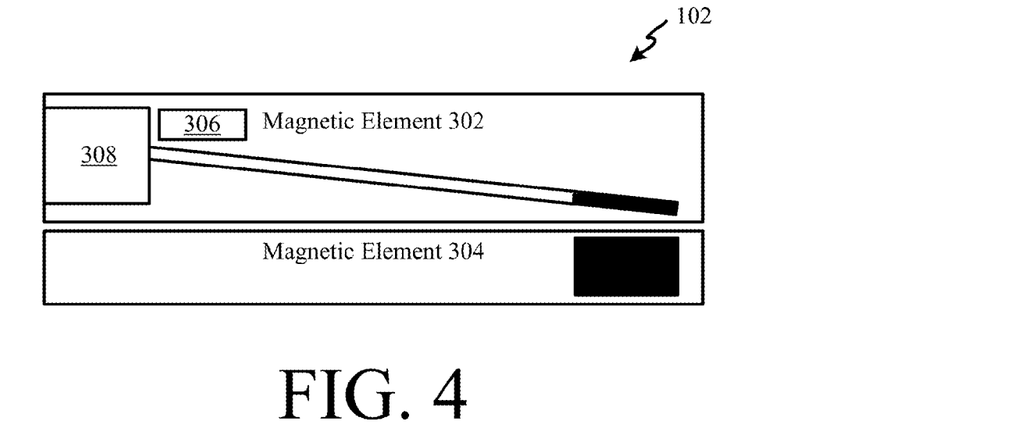

As shown in FIGS. 3-4, the wireless sensor 102 comprises two elements 302 and 304. A first element 302 comprises a sensor circuit 306 and a piezoelectric transducer element 310. The piezoelectric transducer element 310 is cantilevered within an enclosure 316 via a mechanical support 308. As such, the piezoelectric transducer element 310 is movable or can oscillate in two opposing directions shown by arrows 318 and 320. Also, an end of the piezoelectric transducer element 310 is coated with a magnetic material 312, such as a ferromagnetic material or a permanent magnet material.

The second element 304 comprises a magnet 314 which is at least partially disposed within an enclosure 324. The magnet 314 is provided to cause the piezoelectric transducer element 310 with the coating material 312 to bend in direction 320 when the second element 304 is moved in proximity to the first element 302, as shown in FIG. 4. The bending causes the piezoelectric transducer element 310 to transition from its unloaded position shown in FIG. 3 to its loaded position shown in FIG. 4. This movement and magnetic attraction of the piezoelectric transducer element 310 is facilitated by a magnetic coating 312 disposed at an end thereof. The magnetic coating 312 can include, but is not limited to, a thin ferromagnetic material or a permanent magnet material.

When the second element 304 is moved away from the first element 302 (or vice versa), the piezoelectric transducer element 310 springs back to its unloaded position in a damped sinusoidal manner. In this regard, the piezoelectric transducer element 310 oscillates and eventually returns to its unloaded state shown in FIG. 3. As a result of this oscillation, electrical energy is produced by the piezoelectric transducer element 310. This electrical energy is harvested by ultra-low power electronics (e.g., a boost converter and/or a storage capacitor which may form part of sensor circuit 306). The ultra-low power electronics use the harvested energy to power at least a communications portion of the sensor circuit 306. The communications portion of the sensor circuit 306 comprises, but is not limited to, a wireless transceiver, an antenna and/or other electronics (e.g., capacitors, resistors, inductors, transistors, processors, memory, etc.). Transceivers and antennas are well known in the art, and therefore will not be described herein. Any known or to be known transceiver and/or antenna can be used herein without limitation.

Figure 5:
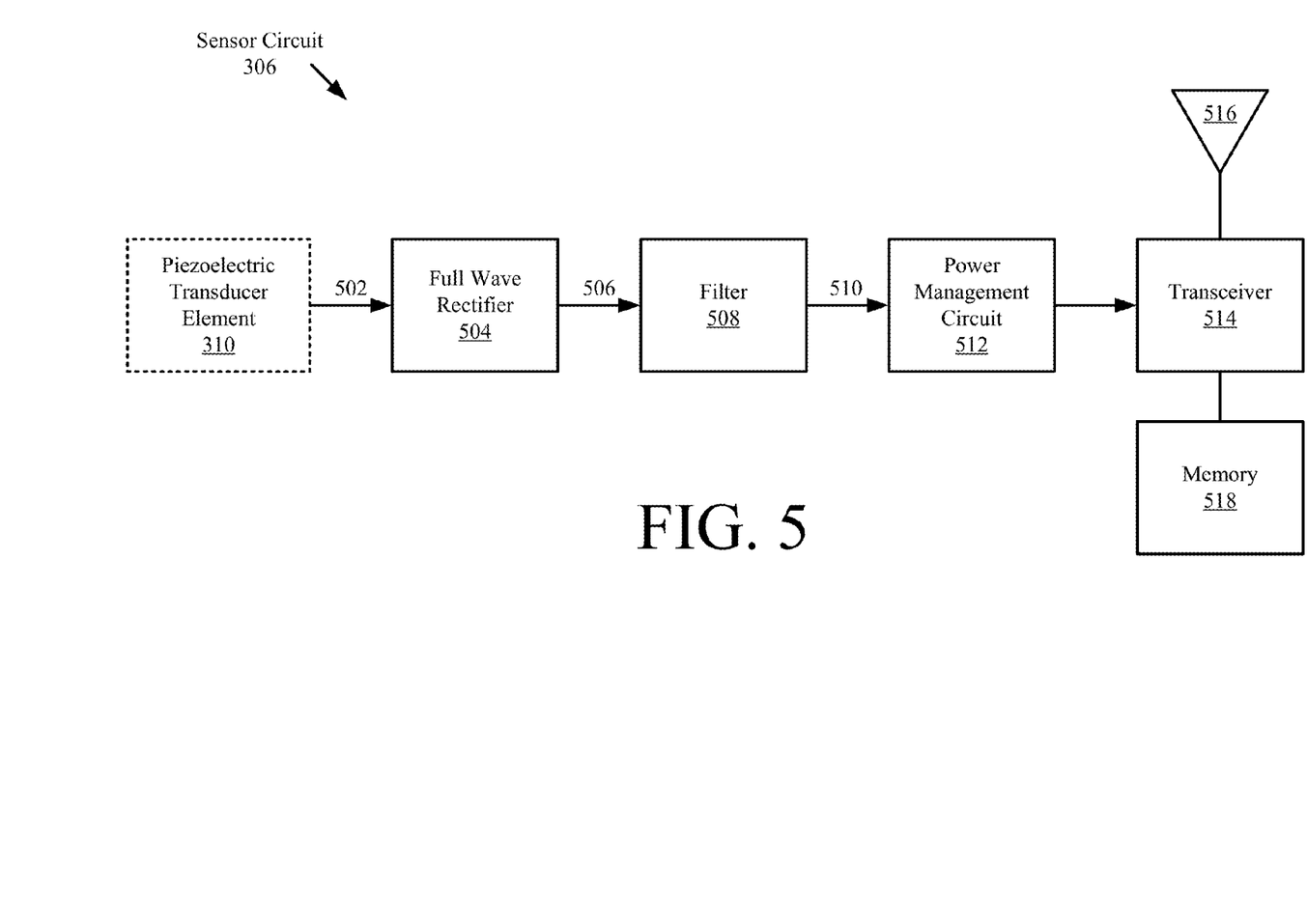
FIG. 5 is a block diagram of an exemplary architecture for a sensor circuit.
Figure 6:
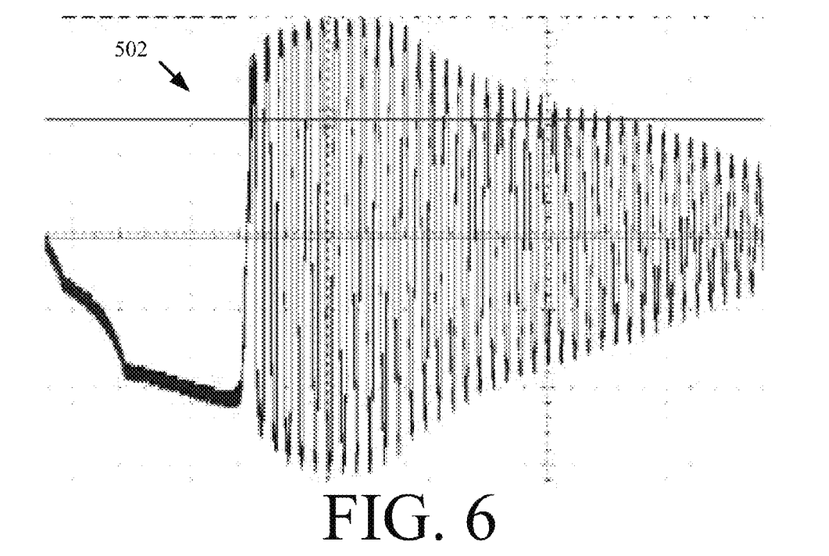
FIG. 6 is a graph showing an Alternating Current ("AC") signal generated by a piezoelectric transducer of a wireless sensor shown in FIG. 1.
Figure 7:
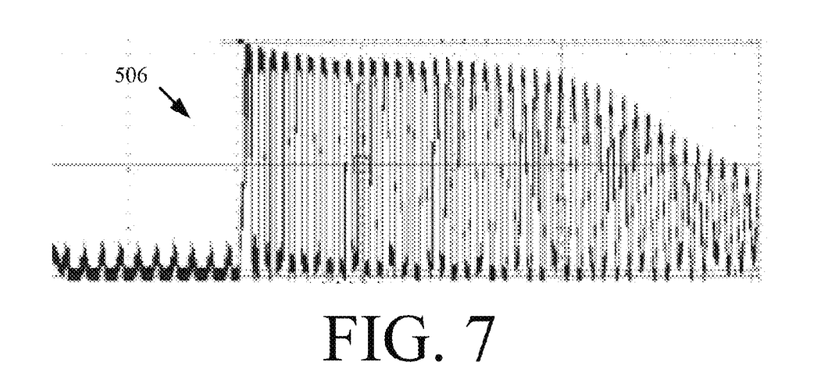
FIG. 7 is a graph showing a full wave rectified signal generated using the AC signal shown in FIG. 6.
Figure 8:
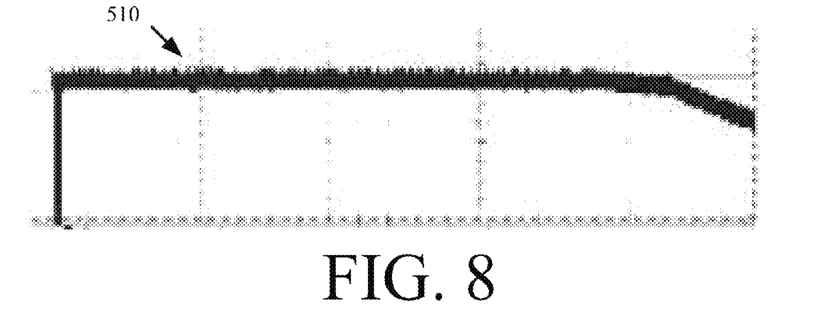
FIG. 8 is a graph showing a Direct Current ("DC") signal generated using the full wave rectified signal shown in FIG. 7.

Referring now to FIG. 5, there is provided a block diagram of an exemplary architecture for the sensor circuit 306. As shown in FIG. 5, the sensor circuit 306 comprises a full wave rectifier 504 coupled to the piezoelectric transducer element 310. The piezoelectric transducer element 310 produces an AC output signal 502 when it oscillates. A graph of the AC output signal 502 is provided in FIG. 6. The AC output signal 502 is processed by a full wave rectifier 504 to generate a full wave rectified signal 506. A graph of the full wave rectified signal 506 is provided in FIG. 7. The full wave rectified signal 506 is then filtered by filter 508 to generate a filtered DC output voltage 510. A graph of the filtered DC output voltage 510 is provided in FIG. 8.

The filtered DC output voltage 510 is then provided to a power management circuit 512. The power management circuit 512 then supplies power to a transceiver 514. Transceiver 514 is configured to transmit information stored in a memory 518 via antenna 516. This information can include, but is not limited to, a unique code, a unique identifier (e.g., a MAC address that is linked to a physical address), and/or a value indicating the state of an object to which the wireless sensor is attached. The transmitted information can then be used by a remote device to determine the physical location of the object within a facility and/or track changes in state of the object (i.e., track when a door, window, drawer or lid has been opened and/or closed).

Figure 9:
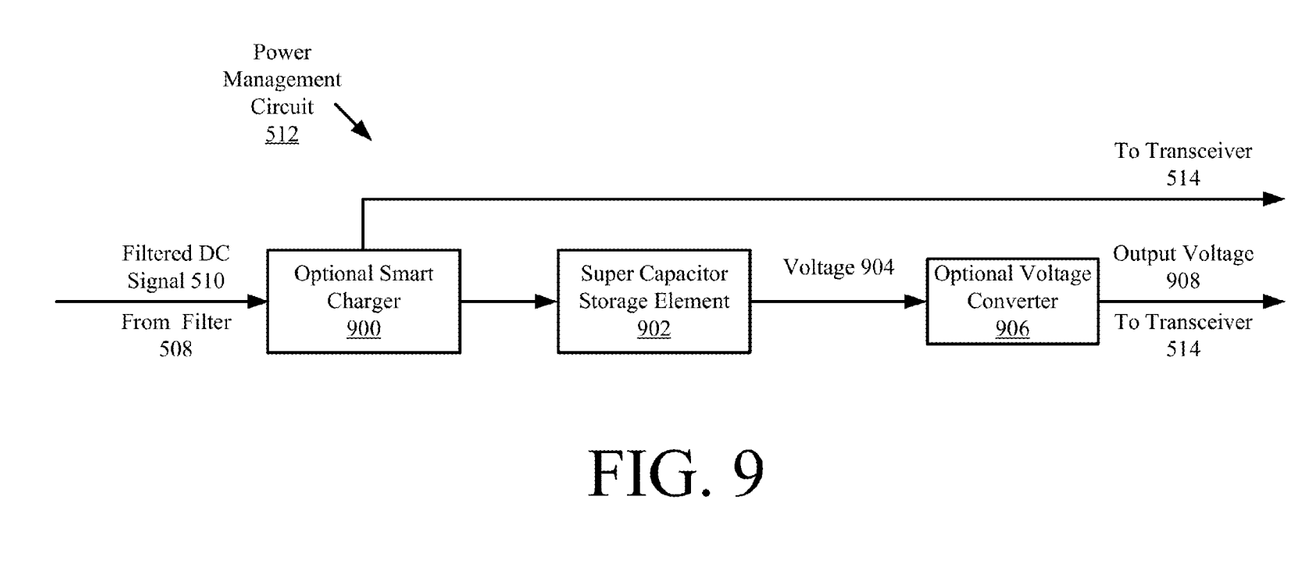
FIG. 9 is a block diagram of an exemplary architecture for the power management circuit shown in FIG. 5.

Referring now to FIG. 9, there is provided a schematic illustration of an exemplary architecture for the power management circuit 512. As shown in FIG. 9, the power management circuit 512 comprises a Super Capacitor ("SC") storage element 902. The available power from filter 508 is used to charge the SC storage element 902. In this regard, the filtered DC output voltage 510 is supplied to the SC storage element 902 via an optional smart charger 900. An output voltage 904 of the SC storage element 902 is supplied to the transceiver 514. In some cases, an optional voltage converter 906 is used to process the output voltage 904 prior to supplying the same to the transceiver 514. The processed output voltage has reference number 908 in FIG. 9. The sensor circuit 306 is considered to be fully operational when the output voltage 904 or 908 reaches a level that is sufficient to cause the transceiver 514 to perform the intended operations thereof.

Smart chargers, super capacitors and voltage converters are well known in the art. Any known or to be known smart charger, super capacitor and/or voltage converted can be used herein without limitation.

Figure 10:
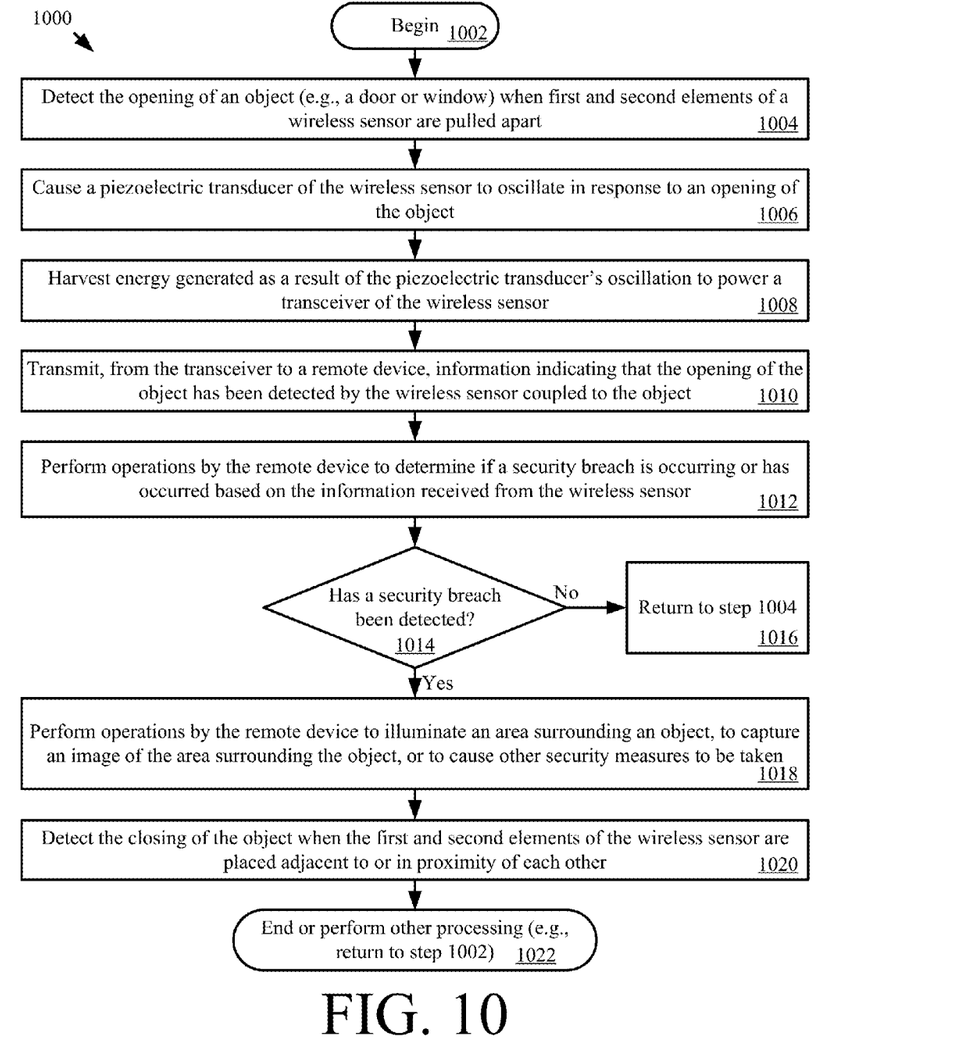
FIG. 10 is a flow diagram of an exemplary method for detecting the opening or closing of an object.

Referring now to FIG. 10, there is provided a flow diagram of an exemplary method 1000 for detecting an opening and closing of an object (e.g., door 204 of FIG. 2 or window). The method 1000 begins with step 1002 and continues with step 1004. In step 1004, the opening of the object is detected when first and second elements (e.g., magnetic elements 302 and 304 of FIG. 3) of a wireless sensor (e.g., wireless sensor 102, 104 or 106 of FIG. 1) are pulled apart. In some scenarios, the first element (e.g., magnetic element 304 of FIG. 3) comprises a magnet (e.g., magnet 314 of FIG. 3) and the second element (e.g., magnetic element 302 of FIG. 3) comprises a piezoelectric transducer (e.g., piezoelectric transducer 310 of FIG. 3) with an end (e.g., end 322 of FIG. 3) having a magnetic coating (e.g., magnetic material 312 of FIG. 3). The piezoelectric transducer is cantilevered within an enclosure (e.g., enclosure 316 of FIG. 3) of the wireless sensor by a mechanical support (e.g., mechanical support 308 of FIG. 3). The first element is disposed on a moving part of the object (e.g., moving door 204 of FIG. 2). The second element is disposed on a non-moving part of the object (e.g., door frame 202 of FIG. 2). As such, the piezoelectric transducer (e.g., piezoelectric transducer 310 of FIG. 3) is caused to oscillate in response to the opening of the object, as shown by step 1006.

Next in step 1008, energy generated as a result of the piezoelectric transducer's oscillation is harvested to power a transceiver. Information is then transmitted from the transceiver to a remote device as shown by step 1010. The information indicates that the opening of the object has been detected by the wireless sensor coupled to the object. In some scenarios, the information specifies a logical address linked to a physical location of the object. The logical address may comprise a MAC address.

This information is used in step 1012 by the remote device to determine if a security breach is occurring or has occurred. If a security breach was not detected in step 1012 [1014:NO], then step 1016 is performed where method 1000 returns to step 1004. In contrast, if a security breach was detected in step 1012 [1014:YES], then method 1000 continues with step 1018-1020. These steps involve: performing operation by the remote device to illuminate an area surrounding an object, to capture an image of the area surrounding the object, or to cause other security measures to be taken; detecting the closing of the object when the first and second elements of the wireless sensor are placed adjacent to or in proximity of each other. Subsequently, step 1022 is performed where method 1000 ends or other processing is performed.

As evident from the above discussion, the novel wireless sensors employ a piezoelectric transducer and a permanent magnet to detect an opening event. The opening event causes the sensor circuit to generate power. This power is supplied to a wireless transceiver so that a unique code or identifier is transmitted to a nearby network node. Since the wireless sensor generated the requisite power needed to power its internal circuitry, it is absent of batteries and wiring to an electrical power grid, making installation cheaper and easier. Also, the wireless sensor requires no servicing.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method for detecting an opening and closing of an object comprising:
    causing a cantilevered piezoelectric transducer of a wireless sensor to bendingly move in an oscillating manner in response to an opening of the object resulting from a pulling force applied thereto that is equal to or greater than a magnetic attraction force between a magnetically coated free-end of the cantilevered piezoelectric transducer and a magnet;
    harvesting energy generated as a result of the cantilevered piezoelectric transducer's oscillation to power a transceiver of the wireless sensor; and
    transmitting, from the transceiver to a remote device, information indicating that the opening of the object has been detected by the wireless sensor coupled to the object.

2. The method according to claim 1, wherein the information specifies a logical address linked to a physical location of the object.

3. The method according to claim 2, wherein the logical address is a Media Access Control ("MAC") address.

4. The method according to claim 1, wherein the object is a door or window.

5. The method according to claim 1, further comprising performing operations by the remote device to determine if a security breach is occurring or has occurred based on said information received from the transceiver.

6. The method according to claim 5, further comprising performing operating by the remote device to illuminate an area surrounding the object or capture an image of the area surrounding the object when it is determined that a security breach is occurring or has occurred.

7. The method according to claim 1, further comprising detecting the opening of the object when first and second elements of the wireless sensor are pulled apart.

8. The method according to claim 7, wherein the first element comprises the magnet and the second element comprises the cantilevered piezoelectric transducer with the magnetically coated free end.

9. The method according to claim 8, wherein the first element is disposed on a moving part of the object and the second element is disposed on a non-moving part of the object.

10. The method according to claim 8, wherein the cantilevered piezoelectric transducer is cantilevered within an enclosure of the wireless sensor by a mechanical support.

11. A wireless sensor, comprising:
    a cantilevered piezoelectric transducer that is caused to bendingly move in an oscillating manner in response to an opening of an object resulting from a pulling force applied thereto that is equal to or greater than a magnetic attraction force between a magnetically coated free-end of the cantilevered piezoelectric transducer and a magnet;
    an electronic circuit harvesting energy generated as a result of the cantilevered piezoelectric transducer's oscillation that is to be used to power a transceiver of the wireless sensor; and
    the transceiver transmitting, to a remote device, information indicating that the opening of the object has been detected by the wireless sensor coupled to the object.

12. The wireless sensor according to claim 11, wherein the information specifies a logical address linked to a physical location of the object.

13. The wireless sensor according to claim 12, wherein the logical address is a Media Access Control ("MAC") address.

14. The wireless sensor according to claim 11, wherein the object is a door or window.

15. The wireless sensor according to claim 11, wherein the information is used by remote device to determine if a security breach is occurring or has occurred based on said information received from the transceiver.

16. The wireless sensor according to claim 11, wherein an area surrounding the object is illuminated or an image of the area surrounding the object is captured when it is determined that a security breach is occurring or has occurred based on said information.

17. The wireless sensor according to claim 11, wherein the opening of the object is detected when first and second elements of the wireless sensor are pulled apart.

18. The wireless sensor according to claim 17, wherein the first element comprises the magnet and the second element comprises the cantilevered piezoelectric transducer.

19. The wireless sensor according to claim 18, wherein the first element is disposed on a moving part of the object and the second element is disposed on a non-moving part of the object.

20. The wireless sensor according to claim 18, wherein the cantilevered piezoelectric transducer is cantilevered within an enclosure of the wireless sensor by a mechanical support.

* * * * *